United States Patent [19]

Sunamori et al.

[11] 4,129,545
[45] Dec. 12, 1978

[54] THERMOSETTING ACRYLIC COPOLYMER USABLE AS A POWDER PAINT AND METHOD FOR PRODUCING THE SAME

[75] Inventors: Takashi Sunamori; Kōji Matsushima; Susumu Tanaka, all of Otake, Japan

[73] Assignee: Mitsubishi Rayon Co., Ltd., Tokyo, Japan

[21] Appl. No.: 849,559

[22] Filed: Nov. 8, 1977

Related U.S. Application Data

[63] Continuation-in-part of Ser. No. 759,125, Jan. 13, 1977, abandoned.

[30] Foreign Application Priority Data

Jan. 16, 1976 [JP] Japan .................................. 51-4447

[51] Int. Cl.$^2$ .................... C08F 24/00; C08F 124/00; C08F 20/10; C08J 3/12
[52] U.S. Cl. .................... 260/29.6 TA; 260/836; 260/837 R; 526/224; 526/227; 526/273; 526/304; 526/318
[58] Field of Search .................. 260/29.6 TA, 47 UA; 526/273, 304

[56] References Cited

U.S. PATENT DOCUMENTS

| | | | |
|---|---|---|---|
| 3,812,070 | 5/1974 | Kelley | 526/304 |
| 3,821,175 | 6/1974 | Daniels et al. | 526/304 |
| 3,865,904 | 2/1975 | Wingate et al. | 526/273 |
| 3,888,943 | 6/1975 | Labana et al. | 526/273 |
| 3,914,333 | 10/1975 | Labana et al. | 526/273 |
| 3,925,293 | 12/1975 | Knechtges et al. | 526/304 |
| 3,975,476 | 8/1976 | Smalky et al. | 526/304 |
| 3,988,273 | 10/1976 | Tetsuo et al. | 260/29.6 TA |
| 3,988,281 | 10/1976 | Minami et al. | 260/29.6 TA |

FOREIGN PATENT DOCUMENTS 1020063  2/1966  United Kingdom ............ 260/29.6 TA
1259262  1/1972  United Kingdom.

OTHER PUBLICATIONS

Billmeyer "J. Poly Sci." PtC Vol. 8 pp. 161–178 (1965).
Erzin Edit Nakajima "Adv. in Chem." Series 125 ACS 1973 Wash. D.C. pp. 97–107.

*Primary Examiner*—Herbert J. Lilling
*Attorney, Agent, or Firm*—Oblon, Fisher, Spivak, McClelland & Maier

[57] ABSTRACT

Disclosed is a solid thermoplastic acrylic copolymer having a weight average molecular weight of 4,000 to 30,000 for the use as a material for powder paint capable of forming a smooth surface which is produced by copolymerizing, preferably in a suspension copolymerization method, comprising (1) 3 to 30% by weight of at least one comonomer of the formula (I'):

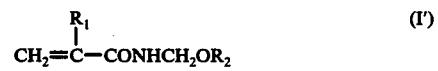

(2) 1 to 50% by weight of at least one comonomer selected from the compounds of the formulae (II') and (III'):

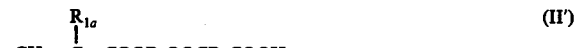

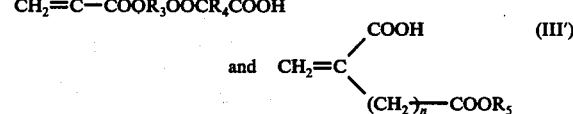

and (3) 20 to 96% by weight of at least one comonomer of the formula (IV'):

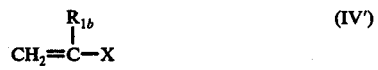

wherein $R_1$, $R_{1a}$ and $R_{1b}$ are respectively a hydrogen atom or methyl group, $R_2$ is an alkyl group of $C_{1-8}$ or a cycloalkyl group of $C_{6-8}$, $R_3$ is an alkylene group of $C_{2-6}$, $R_4$ is an aliphatic group of $C_{2-12}$ optionally containing a carboxyl group or an aromatic group of $C_{6-12}$ optionally containing a carboxyl group, $R_5$ is an aliphatic group of $C_{1-18}$ optionally containing a hydroxyl group or an aromatic group of $C_{6-18}$ optionally containing a hydroxyl group, n is 1 or 2 and X is an ester, nitrile, amide, $R_6COO$— wherein $R_6$ is an alkyl of $C_{1-18}$, glycidylester, glycidylether, or an aromatic group of $C_{6-18}$ or a halogen atom, at a pH of 7 or less in the presence of a catalyst.

13 Claims, No Drawings

THERMOSETTING ACRYLIC COPOLYMER USABLE AS A POWDER PAINT AND METHOD FOR PRODUCING THE SAME

This application is a continuation-in-part of application Ser. No. 759,125, filed on Jan. 13, 1977, and now abandoned.

The present invention relates to thermosetting acrylic copolymer for the use in a powder paint and a method for producing the same.

It was disclosed in British Patent No. 1,259,262 that thermosetting acrylic copolymer containing, as a thermosetting functional group, an N-alkoxyalkylamide is useful as a material for producing powder paint. This type of acrylic copolymer also contains an unsaturated carboxylic acid comonomer having 3 to 5 carbon atoms and a relatively high acidity, which comonomer is effective as a catalyst for promoting a cross-linking reaction of the above-mentioned functional group when the acrylic copolymer is thermoset. In the thermosetting process of a powder paint comprising the above-mentioned type of acrylic copolymer, both the formation of a coating film by melting and fixing the powder paint onto a substrate and the cross-linking reaction of the functional groups in the acrylic copolymer occur concurrently. However, the cross-linking reaction of the functional groups of the acrylic copolymer has a tendency to finish before the melting of the powder paint and the complete formation of the coating film. That is, the cross-linkages are formed when the powder paint is in a state of very fine articles. Due to the excessively early formation of the cross-linkages, it is difficult to provide a coating film which has a smooth surface. Further, the uneven surface portion of the coating film sometimes contains very small bubbles therein. The above-mentioned coating film does not have sufficiently high resistances to water, corrosion, and alkali.

Under these circumstances, the powdered paint industry strongly desired to provide a new type of powdered paint which does not exhibit the above-mentioned disadvantages.

An object of the present invention is to provide a thermosetting acrylic copolymer useful for powder paint, which can form a smooth coating film surface, and a method for producing the same.

The other object of the present invention is to provide a thermosetting acrylic copolymer useful for powdered paint, which can provide a coating film having high resistances to solvent and to corrosion, and a method for producing the same.

The above objects can be attained by carrying out the present invention. The thermosetting acrylic copolymer of the present invention comprises:

(1) 3 to 30% by weight of at least one repeating unit of the formula (I):

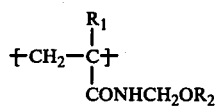

wherein $R_1$ represents a hydrogen atom or methyl group, and $R_2$ represents an alkyl group having 1 to 8 carbon atoms or a cycloalkyl group having 6 to 8 carbon atoms, (2) 1 to 50% by weight of at least one repeating unit selected from the groups of the formulae (II) and (III):

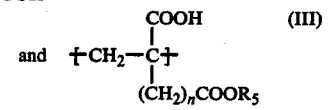

wherein $R_{1a}$ represents a hydrogen atom or a methyl group, $R_3$ represents an alkylene group having 2 to 6 carbon atoms, $R_4$ represents an aliphatic group containing or not containing a carboxyl group and having 2 to 12 carbon atoms or an aromatic group containing or not containing a carboxyl group and having 6 to 12 carbon atoms, $R_5$ represents an aliphatic group containing or not containing a hydroxyl group and havng 1 to 18 carbon atoms or an aromatic group containing or not containing a hydroxyl group and having 6 to 18 carbon atoms, and n represents an integer of 1 or 2, and (3) 20 to 96% by weight of at least one repeating unit of the formula (IV):

wherein $R_{1b}$ represents a hydrogen atom or methyl group, and X represents an ester, nitrile, amide, $R_6COO-$ in which $R_6$ represents an alkyl group having 1 to 18 carbon atoms, glycidylester, glycidylether, or an aromatic group having 6 to 18 carbon atoms or a halogen atom, said polymer having a weight average molecular weight of 4,000 to 30,000 and being in a solid state aT normal temperature.

The thermosetting acrylic copolymer can be produced by the method of the present invention which comprises polymerizing:

(1) 3 to 30% by weight of at least one comonomer of the formula (I'):

wherein $R_1$ represents a hydrogen atom or methyl group and $R_2$ represents an alkyl group having 1 to 8 carbon atoms or a cycloalkyl group having 6 to 8 carbon atoms, (2) 1 to 50% by weight of at least one comonomer selected from the compounds of the formulae (II') and and (III'):

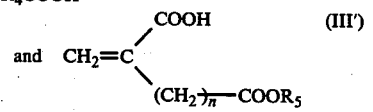

wherein $R_{1a}$ represents a hydrogen atom or methyl group, $R_3$ represents an alkylene group having 2 to 6 carbon atoms, $R_4$ represents an aliphatic group containing or not containing a carboxyl group and having 2 to 12 carbon atoms or an aromatic group containing or not containing a carboxyl group and having 6 to 12 carbon atoms, $R_5$ represents an aliphatic group containing or not containing a hydroxyl group and having 1 to 18 carbon atoms or an aromatic group containing or not containing a hydroxyl group and having 6 to 18 carbon atoms, and n represents an integer of 1 or 2, and (3) 20 to 96% by weight of at least one comonomer of the formula (IV'):

(IV')

wherein $R_{1b}$ represents a hydrogen atom or methyl group, and X represents an ester, nitrile, amide, $R_6COO-$ wherein $R_6$ represents an alkyl group having 1 to 18 carbon atoms, glycidylester, glycidylether, or an aromatic group having 6 to 18 carbon atoms or a halogen atom, at a pH of 7 or less in the presence of a catalyst, to form a copolymer having a weight average molecular weight of 4,000 to 30,000 and being in a solid state at a normal temperature.

The present invention further involves a thermosetting acrylic powder paint which comprises the thermosetting acrylic copolymer of the present invention set forth above.

The acrylic copolymer of the present invention can be prepared by copolymerizing at least one comonomer of the formula (I'):

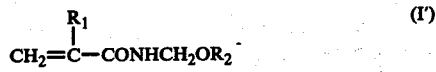
(I')

at least one comonomer selected from the compounds of the formulae (II') and (III'):

(II')

and

(III')

and at least one comonomer of the formula (IV'):

(IV')

in which formulae $R_1$, $R_{1a}$, $R_{1b}$, $R_2$, $R_3$, $R_4$, $R_5$, n and X are respectively defined hereinbefore.

The group of the formula (I) in the acrylic copolymer of the present invention is derived from the comonomer of the formula (I').

The comonomer of the formula (I') may be an acrylamide compound or a methacrylamide compound, in which compound the alkoxy group -$OR_2$ may be methoxy, ethoxy, n-propoxy, n-butoxy, n-octoxy or n-cyclohexoxy. The acrylic copolymer containing the comonomer of the formula (I') in an amount of 3 to 30% by weight, preferably, 5 to 20% by weight, has an excellent thermosetting property and melt-flowing property when the copolymer is subjected to a baking process. When the comonomer of the formula (I') is used in an amount of less than 3% by weight, the resultant acrylic copolymer has a poor thermosetting property. On the other hand, when this comonomer is used in an amount of more than 30% by weight, the resulting acrylic copolymer has a low melt-flowing property in the baking process. This low melt-flowing property causes a poor film-forming property of the acrylic copolymer.

Also, it is preferable that the substituent $R_2$ in the formula (I') be an alkyl group having 3 to 8 carbon atoms, because the resultant acrylic copolymer is well-balanced in its melt-flowing property and cross-linking property during the baking process.

The groups of the formulae (II) and (III) in the acrylic copolymer of the present invention are derived from the comonomers of the formulae (II') and (III').

The comonomers of the formula (II') may be selected from divalent and trivalent carboxylic acid monoesters of hydroxyalkyl acrylates and hydroxyalkyl methacrylates. The hydroxyalkyl acrylates and the hydroxyalkyl methacrylates contain a hydroxyalkyl group which may be a hydroxyethyl, hydroxypropyl, hydroxybutyl, hydroxypentyl or hydroxyhexyl group. The hydroxyalkyl groups having 2 to 6 carbon atoms are more suitable for the comonomers of the formula (II'), because this type of comonomer has the proper acidity. The divalent and trivalent carboxylic acids may be selected from divalent and trivalent aliphatic and aromatic carboxylic acids, for example, succinic acid, o-, m- and p-phthalic acids, $\Delta^1$-, $\Delta^2$-, $\Delta^3$- and $\Delta^4$-tetrahydrophthalic acids, hexahydrophthalic acid, naphthalene dicarboxylic acids, trimellitic acid and anhydrides of the above-mentioned acids.

The comonomers of the formula (III') may be selected from monoalkyl esters of itaconic acid and α-methylene glutaric acid. In the comonomers of the formula (III'), the substituent $R_5$ may be selected from the group consisting of methyl, ethyl, propyl, butyl, pentyl, hexyl, octyl, dodecyl, stearyl, benzyl, $C_4H_9$-O-CH(OH)-$CH_2$-, HO-$CH_2CH_2$—, HO-$(CH_2)_3$—, HO-$CH_2$-CH(OH)-$CH_2$—,

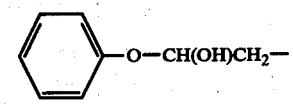

and $C_3H_7COOCH_2$-CH(OH)$CH_2$—. It is preferable that the compound of the formula (II') has at least 9 carbon atoms, and the compound of the formula (III') has at least 6 carbon atoms, more preferably, at least 8. The compounds of the formulae (II') and (III') have proper acidity. Compared with these compounds, the conventional unsaturated carboxylic acids having 5 carbon atoms or less, for example, acrylic acid, methacrylic acid, crotonic acid, itaconic acid and Δ-methylene-glutaric acid, have a relatively high acidity. Therefore, if these conventional unsaturated carboxylic acids are used in place of the specified compounds of the formulae (II') and (III'), the resultant acrylic copolymer containing the N-alkoxyalkylamide group as a cross-linking group will have a tendency to complete the cross-linking reaction before the formation of the coating film of the copolymer melt is completed in the baking process. Therefore, this type of a acrylic copolymer cannot form the uniform coating film having a smooth surface. Further, the formation of fine bubbles contained in the coating film of the above-mentioned type of the acrylic copolymer cannot be avoided. Accordingly, the resultant coating film is poor in glossiness.

While the compounds of the formulae (II') and (III') have a lower acidity than the conventional unsaturated carboxylic acids having 5 carbon atoms or less, the groups of the formulae (II) and (III) contained in the acrylic copolymer of the present invention have a high enough acidity to function as a catalyst for moderately promoting the cross-linking reaction of the N-alkoxyalkylamide groups in the acrylic copolymer. Accordingly, when the powder paint comprising the acrylic copolymer of the present invention is coated on a substrate and baked, the resultant coating film contains no bubbles therein and has a smooth surface which has a fine appearance. Further, cross-linking reaction can be completely finished during the baking process. Therefore, the resultant coating film has the proper chemical and physical properties.

The repeating units of the formulae (II') and (III') are present in an amount of 1 to 50% by weight, preferably, 1 to 30% by weight, in the acrylic copolymer of the present invention. When the content of the groups is less than 1% by weight, the resultant acrylic copolymer is poor in its thermosetting property. A content of the group higher than 50% by weight results in an excessively high thermosetting property of the acrylic copolymer. This excessively high thermosetting property results in a low melt-flowing property of the acrylic copolymer when the copolymer is being baked. Further, this low melt-flowing property causes poor chemical properties, for example, poor resistances to water and alkali of the resultant coating film.

The repeating unit of the formula (IV) in the acrylic copolymer of the present invention is derived from the copolymer of the formula (IV').

The compound of the formula (IV') may be selected from the class consisting of acrylates and methacrylates each having an alkyl or hydroxyalkyl group having 1 to 18 carbon atoms; cyclohexyl acrylate and methacrylate; benzyl acrylate and methacrylate; phenyl acrylate and methacrylate; vinyl acetate; vinyl propionate; acrylamide; methacrylamide; N-alkyl acrylamide and methacrylamide; dialkyl acrylamide and methacrylamide; N-alkylaminoalkyl acrylate and methacrylate; glycidyl acrylate and methacrylate; methylglycidyl acrylate and methacrylate; styrene; vinyl toluene; t-butyl styrene; and vinyl ester of Versatic acid.

The group of the formula (IV) is an important component of the acrylic copolymer of the present invention for controlling the blocking property of the acrylic copolymer; the resistances to impact, soiling, chemicals and weathering; and the flexibility and processability of the coating film. Accordingly, the content of the group of the formula (IV) may be adjusted within the range from 20 to 96% by weight, preferably, from 40 to 96% by weight, in accordance with the desired properties of the acrylic copolymer. Also, the type of the copolymer of the formula (IV) may be selected in accordance with the desired properties of the acrylic copolymer and with the types of the other component copolymers.

Especially, the acrylic copolymer containing 10% by weight or more of the comonomer of the formula (IV') selected from the aforementioned acrylates and methacrylates is preferable, because the resultant coating film from this type of the acrylic copolymer has an excellent weathering resistance.

The acrylic copolymer of the present invention is required to have a weight average molecular weight of 4,000 to 30,000, preferably, 5,000 to 20,000. An acrylic copolymer having a weight average molecular weight of less than 4,000 makes it difficult to form a coating film which has sufficiently high physical and chemical properties for practical uses. Further, a powder paint comprising this type of acrylic copolymer is difficult to handle because of its high tendency to cause the undesirable above-mentioned blocking phenomenon. On the other hand, an acrylic copolymer having a weight average molecular weight larger than 30,000 makes it difficult to form a coating film which has a smooth surface and which contains no bubbles therein because of its low melt-flowing property. The acrylic copolymer of the present invention can be prepared by any methods of solution copolymerization, suspension copolymerization, bulk copolymerization and emulsion copolymerization. However, the suspension copolymerization is most preferable for the present invention, because this copolymerization method results in a uniform quality of the resultant acrylic copolymer, and can be carried out without the formation of by-products and waste which will cause public polution. In addition, the resultant acrylic copolymer can be easily converted into powder paint.

In the preparation of the acrylic copolymer of the present invention in accordance with the suspension copolymerization method, the comonomer of the formula (I'), both or either of the comonomers of the formulae (II') and (III'), and the comonomer of the formula (IV') are mixed respectively, in the amount mentioned above with a catalyst and a chain transfer agent; the mixture is subjected to the suspension copolymerization in an aqueous medium containing a dispersing agent, and; then, the result acrylic copolymer having the desired molecular weight and chemical structure is separated from the aqueous polymerization medium.

The comonomer of the formula (I') preferably has a relatively high degree of hydrophobic property. This type of comonomer of the formula (I') can be copolymerized with high efficiency by the suspension copolymerization. From this point of view, the comonomers of the formula (I') having the substituent $R_2$ of 3 to 8 carbon atoms are most preferable for the present invention.

The acid comonomers of the formulae (II') and (III') have at least 6 carbon atoms and, therefore, a proper degree of hydrophobic property. Accordingly, the acid comonomers of the formulae (II') and (III') can be copolymerized with a high efficiency to form the acrylic copolymer of the present invention. In order to prepare an acrylic copolymer of high quality by using the comonomer of the formula (III'), in high yields, by suspension copolymerization, it is preferable that the substituent $R_5$ in the formula (III') have at least 3 carbon atoms.

Also, in order to produce an acrylic copolymer of high quality, it is preferable that the sum of the comonomers of the formulae (I'), (II') and (IV') respectively containing a methyl group as the substituents $R_1$, $R_{1a}$ and $R_{1b}$ be an amount of at least 10% based on the total weight of all the comonomers of the formulae (I'), (II') and (IV'). In this case, in the acrylic copolymer of the present invention, the sum of the repeating units of the formulae (I), (II) and (IV) respectively containing a methyl group as the substituents $R_1$, $R_{1a}$ and $R_{1b}$, is an amount of at least 10% based on the total weight of all the repeating units of the formulae (I), (II) and (IV). The above-mentioned type of the acrylic copolymer can provide a powder paint having a very low blocking property high resistances to chemicals, soil and weathering, and an excellent processability.

The polymerization initiator, that is, the catalyst, usable for the method of the present invention, may be selected from radical polymerization initiators having a relatively high degree of hydrophobic property, for example, lauroyl peroxide, benzoyl peroxide, azo-bis-isobutylonitrile and azo-bis-valeronitrile. The chain transfer agent usable for the method of the present invention is preferably selected from the agents having a relatively high degree of hydrophobic property, for example, laurylmercaptan, octylmercaptan and thiophenol. In the method of the present invention, it is preferable that the suspension copolymerization be carried out in the aqueous medium at a pH of 7 or less. At this value of pH, the comonomers of the formulae (I'), (II'), (III') and (IV'), especially of the formulae (II') and (III'), can be copolymerized with high efficiency. The aqueous medium for the suspension copolymerization preferably contains a water-soluble polymeric substance, as a dispersing agent. The water-soluble polymeric substance is required to be effective as the dispersing agent at a pH of 7 or less. The polymeric substance may be selected from polyvinyl alcohol, partially saponified polyvinyl acetate, carboxymethyl cellulose, starch, gelatin and tragacanth gum. The aqueous medium for the suspension copolymerization may contain, as the dispersing agent, for example, calcium carbonate, barium sulfate, calcium sulfate, magnesium carbonate, talc, bentonite, diatomaceous earth, sodium sulfate, calcium chloride and sodium chloride. In order to maintain the pH of the aqueous medium for the suspension copolymerization at the level of 7 or lower, the aqueous medium may contain an organic or inorganic acid, for example, boric acid, phosphoric acid, sulfuric acid, hydrochloric acid, acetic acid, formic acid and fatty acids, in an amount at which the acid does not reduce the activity of any comonomers in the copolymerization system.

The suspension copolymerization is carried out, in general, at a temperature of 50° to 100° C. The resultant acrylic copolymer is in a form of bead. This form of the acrylic copolymer can be separated from the copolymerization mixture by any conventional separating method, for example, filtering, salting out and centrifugation. The separated acrylic copolymer can be dried by a conventional drying method at a temperature of 150° C or lower.

The acrylic copolymer of the present invention can be easily converted into a powder paint and applied onto a substrate to be coated by a conventional powder painting method in which air is used as an applying medium. Further, the powder paint comprising the acrylic copolymer of the present invention may be dispersed in an aqueous medium. This aqueous medium may contain a water-soluble solvent, for example, alcohols, glycols, monoacetylglycols and glycol acetate alkylate, or a dispersing agent consisting of a water-soluble polymeric substance which does not reduce the film-forming property of the acrylic copolymer, for example, acrylic polymers containing carboxylic acid groups and having an acid value of 30 or more. The aqueous medium can optionally contain a water-soluble amine compound or ammonia. The powder paint dispersed in the aqueous medium has an excellent coating property.

The powder paint comprising the acrylic copolymer of the present invention is well-balanced in its melt-flowing property and cross-linking property. Therefore, the powder paint of the present invention can form a coating film which has a fine appearance, a smooth surface, and high resistances to water, chemicals, and impact, but does not contain fine air bubbles.

In order to further improve the quality of the coating film, the powder paint of the present invention may comprise a mixture of the acrylic copolymer of the present invention, preferably, in an amount of 60 to 97% by weight, and an epoxy compound having an epoxy equivalent of 50 to 2000, preferably, in a solid state at normal temperature, and in an amount of 3 to 40% by weight. The content of the epoxy compound exceeding 40% by weight results in a reduced smoothness of the coating surface and lowered chemical and physical properties.

The epoxy compound may be selected from bisphenol A type epoxy resins consisting of a condensation product of bisphenol A with epichlorohydrin or methylepichlorohydrin; polyglycidylesters or polymethylglycidylesters of polycarboxylic acids, for example, terephthalic acid, isophthalic acid, adipic acid and trimellitic acid, and; triglycidyl isocyanurate; vinyl cyclohexene oxide; dicyclopentadiene dioxide; and homo- and co-polymers of glycidyl acrylate and methacrylate, and methylglycidyl acrylate and methacrylate.

The powder paint of the present invention may be used to form a clear coating film or to form a pigmented coating film. In the latter case, the powder paint contains an inorganic or organic pigment, for example, titanium dioxide, iron oxides, carbon black, phthalocyanine blue and phthalocyanine green. The powder paint of the present invention may contain a melt-flow regulator or an agent for improving the configuration of the coating surface.

The powder paint of the present invention may be prepared by a spray-dry method in which the mixture of the acrylic copolymer and the epoxy compound is dissolved in a solvent, for example, alcohols or aromatic solvents, and then, the solution is sprayed so as to allow the fine particles of the solution to be rapidly dried. The powder paint also may be prepared by such a method that the solution of the mixture of the acrylic copolymer and the epoxy compound in the solvent is emulsified in a medium which is not capable of dissolving the mixture and the emulsified particles of the solution are dried. It may also be prepared by such a method that the mixture is melted and uniformly kneaded and the kneaded mixture is cooled and, then, finely pulverized. The most preferable method is such a method that the mixture is melted and kneaded at a temperature of 50° to 150° C and, the kneaded mixture is cooled and finely pulverized.

The powder paint comprising the acrylic copolymer of the present invention and being in the form of fine powder can be applied onto an article to be coated by an electrostatic powder coating method or a fluidized bed coating method. Also, the powder paint dispersed in an aqueous medium can be applied onto the article by an electrostatic powder coating method, spray coating method, curtain flow coator method, roll coator method and the like. The coating film is baked at a temperature of 150° to 250° C for 5 to 60 minutes. The resultant baked coating film has an excellent appearance and a smooth surface.

The powder paint comprising the acrylic copolymer of the present invention can be utilized to coat metallic materials such as steel materials, glass materials, ceramic materials and the like.

The present invention is still further illustrated by the following examples.

EXAMPLE 1

A mixture of 25 parts by weight of methyl methacrylate, 55 parts by weight of n-butyl methacrylate, 15 parts by weight of N-butoxymethyl methacrylamide, 5 parts by weight of 2-hydroxyethyl methacrylate monosuccinate of the formula:

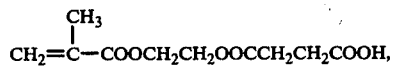

2 parts by weight of n-octylmercaptan and 2 parts by weight of lauroyl peroxide was prepared in a vessel, and, thereafter, air in said vessel was replaced by nitrogen gas. This mixture was admixed in a mixture of 300 parts by weight of water, 1 part by weight of a partially saponified polyvinyl acetate and 5 parts by weight of sodium sulfate in said vessel. The admixture was subjected to a suspension polymerization in the nitrogen atmosphere at a temperature of 80° C for 4 hours. The resultant acrylic copolymer was separated from the aqueous polymerization medium. The acrylic copolymer had a weight average molecular weight of about 10,000 and an acid value of about 11 which is the same as the theoretical acid value calculated from the acid values of the comonomers used in the above polymerization. The remaining aqueous polymerization medium was subjected to a gas chromatographic analysis to determine the amount of the comonomers remaining in the aqueous medium. It was found from the result of the analysis that the amount of the remaining comonomers was very small. From this fact, it was confirmed that a major portion of the comonomers which had existed in the polymerization admixture at the initial stage of the polymerization, was copolymerized to form the acrylic polymer. The acrylic copolymer was finely pulverized with a pulverizer to such an extent that the fine particles of the acrylic copolymer were able to pass through a 200 mesh Tyler standard sieve. The fine particles of the acrylic copolymer were applied onto the surface of a polished mill steel plate having a thickness of 0.8 mm by means of an electrostatic powder coating machine so as to form a coating film having a thickness of 40 $\mu$. This coating film was baked at a temperature of 200° C for 30 minutes. The resultant coating film was firmly fixed onto the mill steel plate. In addition, this film had a high resistance to solvents and an excellent processability. The coating film also had a good appearance and a smooth surface with no small bubbles contained therein, 15 parts by weight of an epoxy resin (Epicort 1004 made by Shell Chemical Co.) were mixed to 100 parts by weight of the acrylic copolymer to provide a paint mixture. This mixture was uniformly kneaded by means of an extruder at a temperature of up to 90° C. The mixture was, thereafter, finely pulverized with a pulverizer to such an extent that the fine particles of the mixture were able to pass through a 200 mesh Tyler standard sieve. The fine particles of the paint mixture were applied onto a polished mill steel plate having a thickness of 0.8 mm by means of an electrostatic powder coating machine in the same manner as that mentioned above. The coating film thus formed was baked at a temperature of 200° C for 30 minutes. The resultant baked coating had a thickness of 45 $\mu$ and a smooth, glossy surface. The coating also had a high degree of transparency and hardness, and an Erichsen value of 5 mm or more. That is, the coating exhibited excellent mechanical properties.

EXAMPLE 2

Procedures identical to those in Example 1 were conducted in Example 2, except that 5 parts by weight of itaconic acid monobutylester were used in place of the 2-hydroxyethyl methacrylate monosuccinate. The resultant acrylic copolymer had a weight average molecular weight of about 10,000 and an acid value of about 14, and was in a solid state. The above acid value was approximately the same as the theoretical acid value calculated from the acid values of the comonomers used. This fact showed that almost the entire amount of the comonomers used was copolymerized to form the acrylic copolymer.

100 parts by weight of the acrylic copolymer prepared above were mixed with 15 parts by weight of the same epoxy compound as used in Example 1 and 57 parts by weight of titanium dioxide. This mixture was melted and kneaded in an extruder, and, then, finely pulverized to such an extent that the particles of the mixture were able to pass through a 200 mesh Tyler standard sieve.

The resultant powdered paint was applied onto a surface of a polished mill steel plate of 0.8 mm in thickness by means of an electrostatic powder coating machine. The coating film thus formed was baked at a temperature of 200° C for 30 minutes. The baked coating had a thickness of about 50 $\mu$, an excellent processability, and a smooth surface. The coating had a fine appearance.

COMPARISON EXAMPLE 1

A mixture of 25 parts by weight of methyl methacrylate, 55 parts by weight of n-butyl methacrylate, 15 parts by weight of N-butoxymethyl methacrylamide, 5 parts by weight of itaconic acid, 2 parts by weight of n-octylmercaptan, and 2 parts by weight of lauroyl peroxide was prepared in a vessel, and thereafter, the vessel was filled with nitrogen gas. This mixture was subjected to the same suspension copolymerization process as that in Example 1. The resultant acrylic copolymer was separated from the aqueous copolymerization medium, washed with water and dried. The acid value of the acrylic copolymer was less than 5. Accordingly, it was confirmed that the acrylic copolymer contained substantially no itaconic acid and that the greater part of the itaconic acid used was dissolved and kept in the aqueous copolymerization medium.

The acrylic copolymer was finely pulverized with a pulverizer to such an extent that the resultant particles of the copolymer were able to pass through a 200 mesh Tyler standard sieve. The powder paint thus prepared was applied onto a surface of a polished mill steel plate of 0.8 mm in thickness by the same means as the electrostatic powder coating machine used in Example 1. The coating film thus formed was baked at a temperature of 200° C for 30 minutes. The baked coating had an inferior bonding property to the mill steel plate, a low resistance to solvents, a low resistance to soiling and an inferior resistance to breakage.

COMPARISON EXAMPLE 2

A mixture of 25 parts by weight of methyl methacrylate, 55 parts by weight of n-butyl methacrylate, 15 parts by weight of N-butoxymethyl methacrylamide, 5 parts by weight of itaconic acid, 0.3 parts by weight of azo-bis-isobutylonitrile and 2 parts by weight of n-octyl-mercaptan was subjected to a bulk polymerization process at a temperature of 70° to 80° C for 4 hours. The resulting acrylic copolymer had a weight average molecular weight of approximately 15,000, and was in a solid state. The acrylic copolymer was finely pulverized with a pulverizer to such an extent that the resulting particles of the acrylic copolymer were able to pass through a 200 mesh Tyler standard sieve. The powder paint prepared above was applied onto a surface of a polished mill steel plate having a thickness of 0.8 mm by the same means as the electrostatic powder coating machine used in Example 1, and baked at a temperature of 200° C for 30 minutes. The thus baked coating on the mill steel plate exhibited a rough surface, an inferior bonding force to the plate, a poor processability and a high degree of hardness.

100 parts by weight of the above acrylic copolymer were mixed with 15 parts by weight of the same epoxy compound as used in Example 1, melted and kneaded at a temperature of 100° C, cooled and, then, finely pulverized with a pulverizer to such an extent that the resultant particles of the copolymer were able to pass through a 200 mesh Tyler standard sieve. The thus prepared powdered paint was applied and baked onto the surface of a polished mill steel plate by the same method as that in Example 1. The resultant coating film had a proper degree of hardness and was firmly bonded to the plate. However, the coating film had a rough surface and a poor appearance.

COMPARISON EXAMPLE 3

A mixture of 35 parts by weight of methyl methacrylate, 48 parts by weight of n-butyl methacrylate, 12 parts by weight of N-methoxymethyl methacrylamide, 5 parts by weight of methacrylic acid, 2 parts by weight of lauroyl peroxide, 1.5 parts by weight of 2-mercaptoethanol was added into a solution of 1 part by weight of a partially saponified polyvinyl acetate, 5 parts by weight of sodium sulfate, and 0.5 parts by weight of boric acid in 400 parts by weight of water, to prepare a copolymerization mixture. The mixture was subjected to a suspension copolymerization process at a temperature of 80° C for 4 hours. After completion of the copolymerization, the resulting acrylic copolymer was separated from the copolymerization medium and dried. The dried acrylic copolymer was subjected to an analysis test for determining the nitrogen content thereof. It was confirmed from the analysis test that the amount of N-methoxymethyl methacrylamide which had been copolymerized into the acrylic copolymer was only about 50% based on the total weight thereof used.

The acrylic compound was converted into a powder paint and used to coat the surface of a polished mill steel plate by the same method as that in Example 1. The resultant coating film was inferior in its painting properties.

COMPARISON EXAMPLE 4

A mixture of 35 parts by weight of methyl methacrylate, 48 parts by weight of n-butyl methacrylate, 12 parts by weight of N-methoxymethyl methacrylamide, 5 parts by weight of methacrylic acid, 0.3 parts by weight of azo-bis-isobutylonitrile and 1.5 parts by weight of 2-mercaptoethanol was subjected to a bulk copolymerization process at a temperature of 70° to 80° C for 4 hours. The resultant acrylic copolymer was in a solid state and had a weight average molecular weight of about 8,000.

100 parts by weight of solid acrylic copolymer were mixed with 15 parts by weight of the same epoxy compound as used in Example 1 and 57 parts by weight of titanium dioxide. This mixture was melted and kneaded with an extruder, and then converted into a powder paint by the same method as that in Example 1. The powder paint was used to coat the surface of a polished mill steel plate of 0.8 mm in thickness by means of an electrostatic powder coating machine. The coating film was baked at a temperature of 200° C for 30 minutes. The baked coating film had a proper degree of hardness and a high bonding property to the plate. However, the coating film had an inferior processability. In the case where the thickness of the coating film exceeded 50 μ, numerous bubbles were formed in the coating film, and the film had a rough surface. Therefore, the coating film had a poor appearance.

EXAMPLE 3

The same operations as in Comparison Example 3 were carried out in Example 3, except that 5 parts by weight of 2-hydroxyethyl methacrylate monophthalate of the following formula:

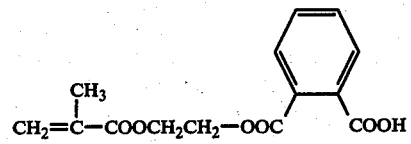

were used instead of the methacrylic acid, to provide a coating film baked at a temperature of 200° C for 30 minutes on the surface of a polished mill steel plate. The resultant coating film had a proper degree of hardness, a high bonding property and a high resistance to breakage. Even if the thickness of the coating film exceeded 50 μ, the surface of the film was smooth and glossy. The coating film had a fine appearance.

EXAMPLE 4

A mixture of 37 parts by weight of methyl methacrylate, 46 parts by weight of tridecyl methacrylate, 10 parts by weight of N-butoxymethyl methacrylamide, 7 parts by weight of 2-hydroxyethyl methacrylate monosuccinate, 1 part by weight of azo-bis-dimethylvaleronitrile and 2 parts by weight of n-octylmercaptan was prepared in a vessel, and, then, the air in the vessel was replaced with nitrogen gas. The mixture was added into a solution of 1 part by weight of a partially saponified polyvinyl acetate and 6 parts by weight of sodium sulfate in 300 parts by weight of water. The resultant mixture was subjected to a suspension copolymerization at a temperature of 70° C for 4 hours. The resulting acrylic copolymer was separated from the aqueous copolymerization medium, and dried. As results of a nitrogen analysis test and a test for determining the acid value, it was confirmed that the entire amounts of the N-butoxymethyl methacrylamide and the comonomers having a carboxylic group were copolymerized together to form the acrylic copolymer. The acrylic copolymer had a weight average molecular weight of about 12,000 and was in a solid state.

100 parts by weight of the above-obtained acrylic copolymer were mixed with 10 parts by weight of the same epoxy compound as used in Example 1 and 55 parts by weight of titanium dioxide. This mixture was melted and kneaded at a temperature not exceeding 100° C. Then, the mixture was finely pulverized with a pulverizer to such an extent that the resultant particles of the mixture were able to pass through a 180 mesh Tyler standard sieve. The powder paint thus prepared was used to coat the surface of a polished mill steel plate having a thickness of 0.8 mm by means of an electrostatic powder coating machine, and baked at a temperature of 200° C for 30 minutes. The baked coating film had a fine appearance, a smooth surface, a high bonding property to the plate, an excellent processability and a high resistance to corrosion.

EXAMPLE 5

In Example 5, 30 parts by weight of the same powder paint containing the acrylic copolymer and the epoxy compound as that prepared in Example 1 was suspended in 70 parts by weight of water which had been adjusted to a pH of 11 by adding β-dimethylaminoethanol thereinto. This suspension was treated in a ball mill for 24 hours to uniformly pulverize and disperse the powder paint in the water. A uniform aqueous dispersion of the powder paint was obtained. The aqueous dispersion was applied onto the surface of the polished mill steel plate with a spray gun, dried and baked at a temperature of 200° C for 30 minutes. The resultant coating film was firmly bonded to the plate and had a smooth surface.

EXAMPLE 6

An acrylic copolymer was prepared by using a mixture of 15 parts by weight of hydroxyethyl methacrylate monosuccinate, 22 parts by weight of methyl methacrylate, 60 parts by weight of n-butyl methacrylate, 10 parts by weight of N-butoxymethyl acrylamide, 2.0 parts by weight of azo-bis-isobutylonitrile and 2 parts by weight of n-octylmercaptan, by using the same process as that in Example 1. 20 parts by weight of the acrylic copolymer were mixed with 78 parts by weight of water containing 2 parts by weight of dimethylaminoethanol. This mixture was charged into a tumbler and shaken for a week. Thereby, a water-soluble copolymer composition was obtained. 25 parts by weight of the water-soluble copolymer composition were mixed with 50 parts by weight of the same powder paint containing the acrylic copolymer and the epoxy compound as that used in Example 1 and with 25 parts by weight of water. The mixture thus prepared was charged into a ball mill and treated therein for 24 hours. An aqueous paint in which the powder paint was uniformly dispersed, was thereby obtained. The aqueous paint was applied onto the surface of a polished mill steel plate with a spray gun, dried and, then, baked at a temperature of 220° C for 30 minutes. The resultant coating film had a smooth surface and, a pencil hardness of 2H, and an Erichsen value of 6 mm.

EXAMPLE 7

A solid acrylic copolymer having a weight average molecular weight of 9,000 was prepared by suspension copolymerizing 45 parts by weight of methyl methacrylate, 25 parts by weight of tridecyl methacrylate, 5 parts by weight of N-butoxymethyl methacrylamide and 25 parts by weight of 2-hydroxyethyl monophthalate in the presence of 3.0 parts by weight of n-octylmercaptan and 2.0 parts by weight of lauroyl peroxide, by the same method as that in Example 1.

To form powder paint for improving the surface of the coating, 100 parts by weight of the above-prepared acrylic copolymer were mixed 20 parts by weight of an epoxy compound (Epicort 1002, made by Shell Chemical Co.), 60 parts by weight of titanium dioxide and 2 parts by weight of a tridecyl methacrylate copolymer, then melted and kneaded in an extruder. The mixture thus prepared was finely pulverized with a pulverizer to such an extent that the resultant particles of the mixture were able to pass through a 200 mesh Tyler standard sieve. The resulting powder paint was applied onto the surface of a polished mill steel plate having a thickness of 0.8 mm by means of an electrostatic powder coating machine and, then, baked at a temperature of 200° C for 30 minutes. The coating film thus formed had a thickness of 40 μ, a lustre value of 85 or more and an excellent processability. The coating film also had a fine appearance.

EXAMPLE 8

A solid acrylic copolymer having a weight average molecular weight of 11,000 was prepared by bulk copolymerizing 45 parts by weight of styrene, 40 parts by weight of tridecyl methacrylate, 10 parts by weight of N-butoxymethyl methacrylamide and 5 parts by weight of 2-hydroxyethyl methacrylate monosuccinate in the presence of 2.0 parts by weight of azo-bis-isobutylnitrile and 2.5 parts by weight of n-octylmercaptan at a temperature of 70° to 90° C for 8 hours.

100 parts by weight of the above-prepared acrylic copolymer were mixed with 10 parts by weight of the same epoxy compound as used in Example 1 and 55 parts by weight of titanium dioxide. This mixture was melted and kneaded in an extruder. The mixture was converted into a powder paint in the same manner as that in Example 1. The powder paint was used to coat a surface of a polished mill steel plate of 0.8 mm in thickness by means of an electrostatic powder coating machine, and baked at a temperature of 220° C for 30 minutes. The resultant coating film had a thickness of 45 μ, a pencil hardness of 2H and an excellent processability. The coating film also had a fine appearance.

What we claim is:

1. A thermosetting acrylic copolymer for the use as powder paint, which comprises
   (1) 3 to 30% by weight of at least one repeating unit of the formula (I):

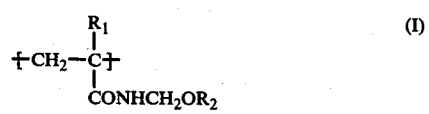

wherein $R_1$ represents a hydrogen atom or methyl group and $R_2$ represents an alkyl group having 1 to 8 carbon atoms or a cycloalkyl group having 6 to 8 carbon atoms,
   (2) 1 to 50% by weight of at least one repeating unit selected from the groups of the formulae (II) and (III):

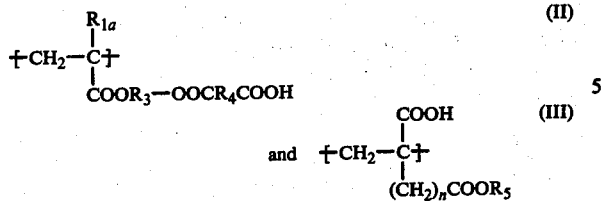

(II)

and

(III)

wherein $R_{1a}$ represents a hydrogen atom or methyl group, $R_3$ represents an alkylene group having 2 to 6 carbon atoms, $R_4$ represents an aliphatic group containing or not containing a carboxyl group and having 2 to 12 carbon atoms or an aromatic group containing or not containing a carboxyl group and having 6 to 12 carbon atoms, $R_5$ represents an aliphatic group containing or not containing a hydroxyl group and having 1 to 18 carbon atoms or an aromatic group containing or not containing a hydroxyl group and having 6 to 18 carbon atoms, and n represents an integer of 1 or 2, and (3) 20 to 96% by weight of at least one repeating unit of the formula (IV):

$$+CH_2-\underset{\underset{X}{|}}{\overset{\overset{R_{1b}}{|}}{C}}+ \quad (IV)$$

wherein $R_{1b}$ represents a hydrogen atom or methyl group, and X represents an ester, nitrile, amide, $R_6COO-$ in which $R_6$ represents an alkyl group having 1 to 18 carbon atoms, glycidylester, glycidylether or aromatic group having 6 to 18 carbon atoms or a halogen atom, said polymer having a weight average molecular weight of 4,000 to 30,000 and being in a solid state at normal temperature.

2. A thermosetting acrylic copolymer as claimed in claim 1, wherein the sum of the repeating units of the formulae (I), (II) and (IV) respectively containing a methyl group as the substituents $R_1$, $R_{1a}$ and $R_{1b}$, is an amount of at least 10% based on the total weight of all the repeating units of the formulae (I), (II) and (IV) in said acrylic copolymer.

3. A thermosetting acrylic copolymer as claimed in claim 1, wherein said substituent $R_2$ in said formula (I) is an alkyl group having 3 to 8 carbon atoms.

4. A thermosetting acrylic copolymer as claimed in claim 1, wherein said substituent $R_5$ in the formula (III) is an aliphatic group containing or not containing a hydroxyl group and having 3 to 18 carbon atoms or an aromatic group containing or not containing a hydroxyl group and having 6 to 18 carbon atoms.

5. An thermosetting acrylic polymer as claimed in claim 1, wherein said substituent $R_2$ in said formula (I) is an alkyl group having 3 to 8 carbon atoms and said substituent $R_5$ in said formula (III) is an aliphatic group containing or not containing a hydroxyl group and having 3 to 18 carbon atoms or an aromatic group containing or not containing a hydroxyl group and having 6 to 18 carbon atoms.

6. A method for producing a thermosetting acrylic polymer for the use as powder paint, which comprises copolymerizing, by way of a suspension copolymerization in an aqueous medium at a pH of 7 or less, (1) 3 to 30% by weight of at least one comonomer of the formula (I'):

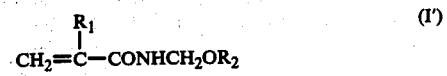

wherein $R_1$ represents a hydrogen atom or methyl group and $R_2$ represents an alkyl group having 1 to 8 carbon atoms or a cycloalkyl group having 6 to 8 carbon atoms, (2) 1 to 50% by weight of at least one comonomer selected from the compounds of the formulae (II') and (III'):

$$CH_2=\overset{\overset{R_{1a}}{|}}{C}-COOR_3OOCR_4COOH \quad (II')$$

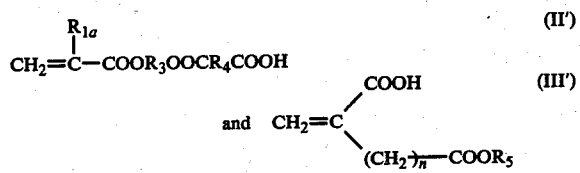

wherein $R_{1a}$ represents a hydrogen atom or methyl group, $R_3$ represents an alkylene group having 2 to 6 carbon atoms, $R_4$ represents an aliphatic group containing or not containing a carboxyl group and having 2 to 12 carbon atoms or an aromatic group containing or not containing a carboxyl group and having 6 to 12 carbon atoms, $R_5$ represents an aliphatic group containing or not containing a hydroxyl group and having 1 to 18 carbon atoms or an aromatic group containing or not containing a hydroxyl group and having 6 to 18 carbon atoms, and n represents an integer of 1 or 2, and (3) 20 to 96% by weight of at least one comonomer of the formula (IV'):

wherein $R_{1b}$ represents a hydrogen atom or methyl group, and X represents an ester, nitrile, amide, $R_6COO-$ wherein $R_6$ represents an alkyl group having 1 to 18 carbon atoms, glycidylester, glycidylether or aromatic group having 6 to 18 carbon atoms or a halogen atom, in the presence of a hydrophobic radical polymerization initiator and chain transfer agent, catalyst, to form a copolymer having a weight average molecular weight of 4,000 to 30,000 and being in solid state at a normal temperature.

7. A method as claimed in claim 6, wherein the sum of the comonomers of the formulae (I'), (II') and (IV') respectively containing a methyl group as the substituents $R_1$, $R_{1a}$ and $R_{1b}$, is an amount of at least 10% based on the total weight of all the comonomers of the formulae (I'), (II') and (IV').

8. A method as claimed in claim 6, wherein said substituent $R_2$ in the formula (I') is an alkyl group having 3 to 8 carbon atoms.

9. A method as claimed in claim 6, wherein said substituent $R_5$ in the formula (III') is an aliphatic group having 3 to 18 carbon atoms or an aromatic group.

10. A method as claimed in claim 6, wherein said substituent $R_2$ in the formula (I') is an alkyl group having 3 to 8 carbon atoms and said substituent $R_5$ in the formula (III') is an aliphatic group having 3 to 18 carbon atoms or an aromatic group.

11. A method as claimed in claim 6, wherein said aqueous medium contains a water-soluble polymeric substance or an inorganic compound.

12. A thermosetting acrylic powder paint which comprises an acrylic copolymer comprising:

(1) 3 to 30% by weight of at least one repeating unit of the formula (I):

$$\begin{array}{c} R_1 \\ | \\ +CH_2-C+ \\ | \\ CONHCH_2OR_2 \end{array} \quad (I)$$

wherein $R_1$ represents a hydrogen atom or methyl group and $R_2$ represents an alkyl group having 1 to 8 carbon atoms or a cycloalkyl group having 6 to 8 carbon atoms, (2) 1 to 50% by weight of at least one repeating unit selected from the groups of the formulae (II) and (III):

$$\begin{array}{c} R_{1a} \\ | \\ +CH_2-C+ \\ | \\ COOR_3-OOCR_4COOH \end{array} \quad (II)$$

$$\text{and} \quad \begin{array}{c} COOH \\ | \\ +CH_2-C+ \\ | \\ (CH_2)_nCOOR_5 \end{array} \quad (III)$$

wherein $R_{1a}$ represents a hydrogen atom or methyl group, $R_3$ represents an alkylene group having 2 to 6 carbon atoms, $R_4$ represents an aliphatic group containing or not containing a carboxyl group and having 2 to 12 carbon atoms or an aromatic group containing or not containing a carboxyl group and having 6 to 12 carbon atoms, $R_5$ represents an aliphatic group containing or not containing a hydroxyl group and having 1 to 18 carbon atoms or an aromatic group containing or not containing a hydroxyl group and having 6 to 18 carbon atoms, and n represents an integer of 1 or 2, and (3) 20 to 96% by weight of at least one repeating unit of the formula (IV):

$$\begin{array}{c} R_{1b} \\ | \\ +CH_2-C+ \\ | \\ X \end{array} \quad (IV)$$

wherein $R_{1b}$ represents a hydrogen atom or methyl group, and X represents an ester, nitrile, amide, $R_6COO-$ in which $R_6$ represents an alkyl group having 1 to 18 carbon atoms, glycidylester, glycidylether or aromatic group having 6 to 18 carbon atoms or a halogen atom, said polymer having a weight average molecular weight of 4,000 to 30,000 and being in solid state at normal temperature.

13. A thermosetting acrylic powder paint as claimed in claim 12, wherein said powder paint is suspended in an aqueous medium.

* * * * *